UNITED STATES PATENT OFFICE.

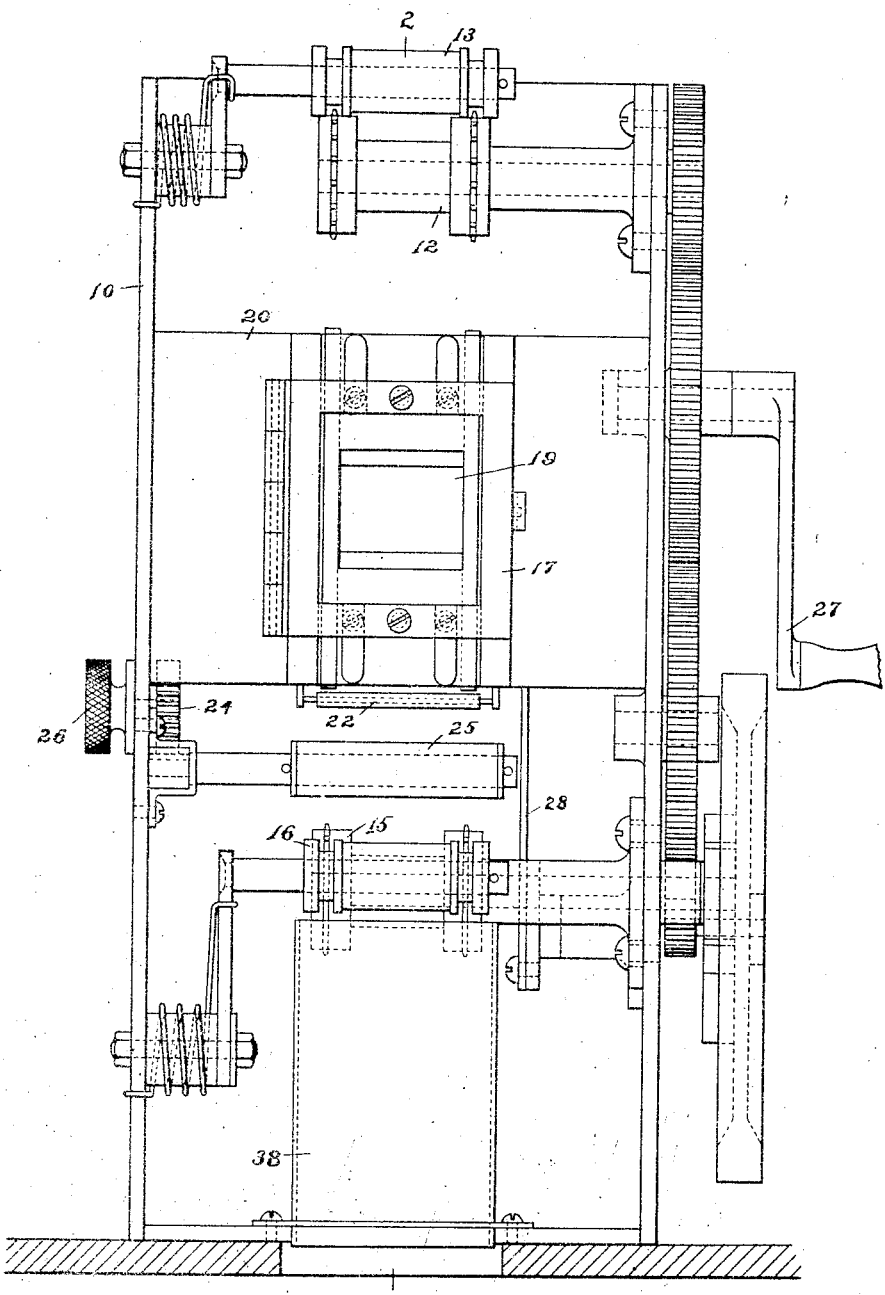

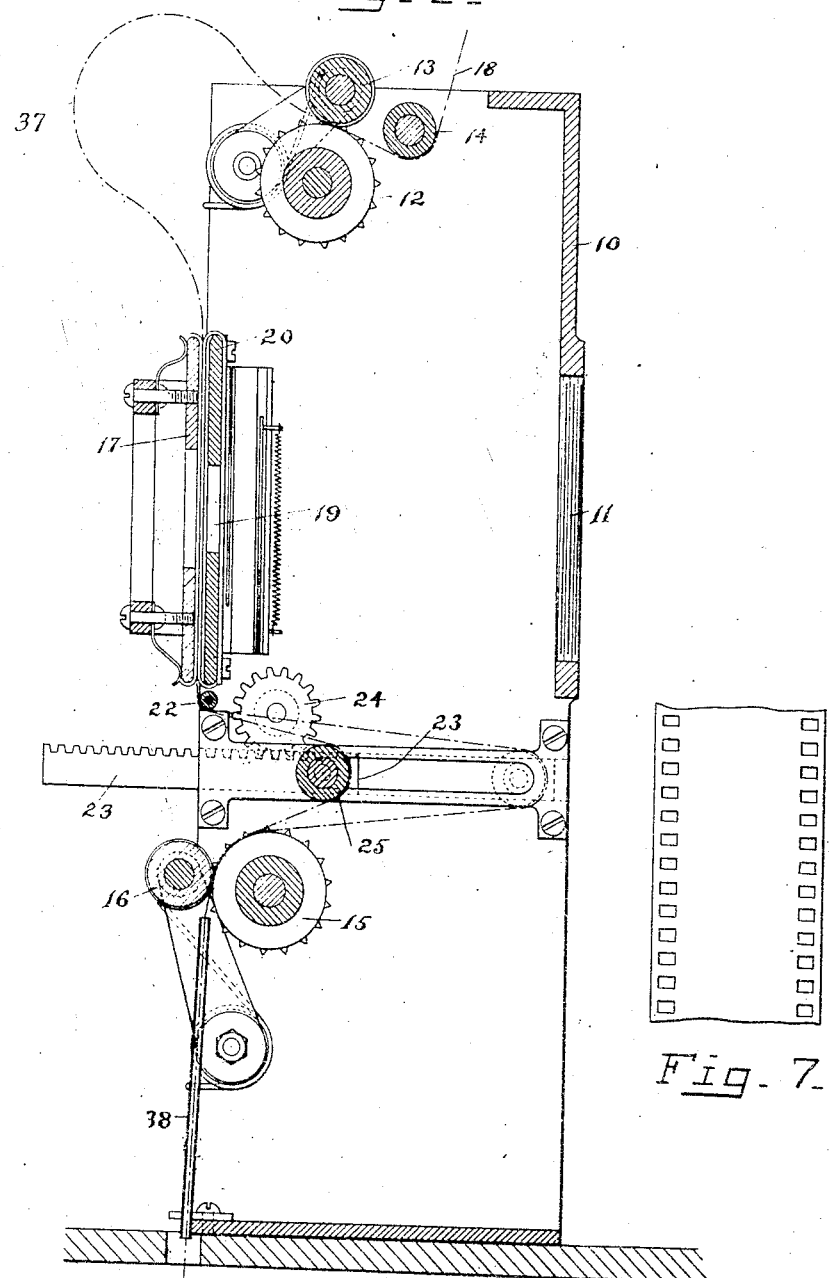

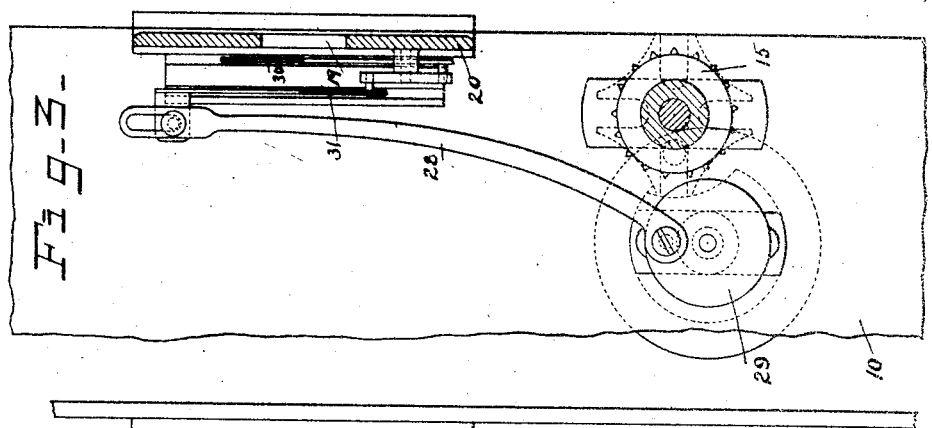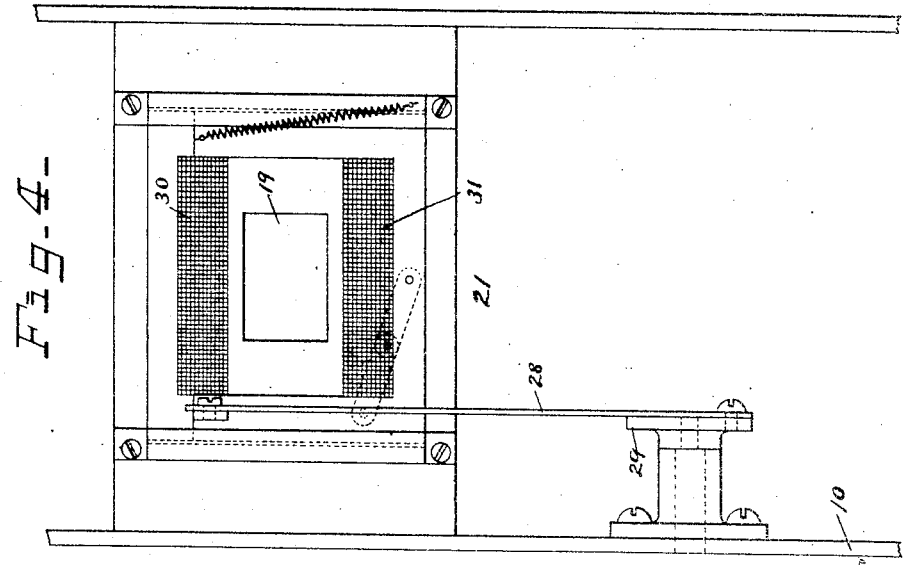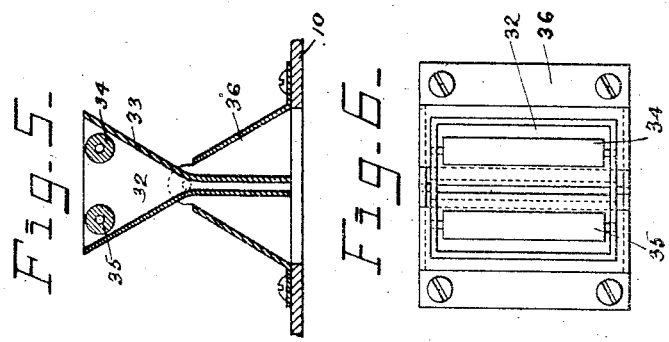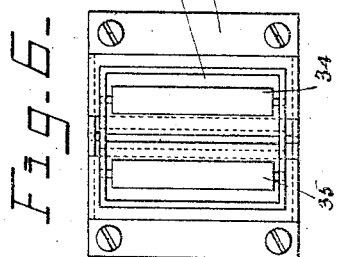

JEAN A. LE ROY, OF NEW YORK, N. Y.

INDEPENDENT FRAMING DEVICE FOR KINETOSCOPES.

No. 864,314.   Specification of Letters Patent.   Patented Aug. 27, 1907.

Application filed March 20, 1906. Serial No. 307,023.

*To all whom it may concern:*

Be it known that I, JEAN A. LE ROY, a citizen of the United States, and a resident of New York, in the county of New York and State of New York, have invented certain new and useful Improvements in Independent Framing Devices for Kinetoscopes, of which the following is a specification.

My invention relates to kinetoscopes and it has for its object to simplify the general arrangement and construction of such apparatus and particularly to provide novel means to register or frame the picture of the film with respect to the diaphragm in the face plate of such apparatus.

For this purpose my invention consists essentially in the arrangement of a film; a feed sprocket; a gate; a face plate; an intermittent sprocket; together with independent means to register or frame the picture of said film with respect to the diaphragm in the said face-plate.

The nature of my invention will be best understood when described in connection with the accompanying drawings in which—

Figure 1 is a rear view of the kinetoscope. Fig. 2 is a vertical section on the line 2—2 Fig. 1. Fig. 3 is a view of the shutter and shutter actuating mechanism. Fig. 4 is a view of the shutter and face plate. Figs. 5 and 6 are views of the entrance chute. Fig. 7 is a plan view of a portion of the film.

Similar characters of reference designate corresponding parts throughout the several views.

Referring now to the drawings, 10 is the kinetoscope frame containing the mechanism for feeding and controlling the film.

11 is the lens mount into which the usual projecting or taking lens may be mounted.

The upper part of the frame 10 contains a continuous sprocket feed roller 12, a spring pressed roller 13 pressing against it, and a fixed guide roller 14. The lower part contains a similar but intermittent sprocket roller 15 and spring pressed roller 16 acting thereon.

17 is a spring pressed gate of the usual construction inclosing the film 18 between it and the diaphragm 19 in the face plate 20. Just below this gate and frame is a fixed film guide roller 22. Between the said gate and the intermittent sprocket 12 is a rack 23 and pinion 24. Fixed to this rack and moving with it is another roller 25 adapted to adjust the film 18 so as to frame it with respect to the diaphragm 19 in the face plate 20. The pinion 24 is connected with an operating thumb screw 26 outside the frame 10.

Motion to operate the continuous feed sprocket 12; intermittent sprocket 15 and shutter 21 is derived through suitable gears from the crank 27 which is usually turned by hand. The continuous sprocket feed and intermittent sprocket and actuating mechanism for moving the film between the gate and face plate is old and well known.

21 is the shutter which is operated by means of the connecting rod 28 eccentrically attached to the intermittent wheel 29 or by equivalent means, and comprises two pieces, 30 and 31 which are adapted to be brought together and separated at the proper intervals. When the film is in motion the shutter is closed, and is open when the film is stationary in the gate. I prefer to make these parts of the shutter of wire netting of about 36 mesh and thereby eliminate to a great extent the disagreeable flicker prevalent with the usual opaque shutter. I may of course use in place of the shutter shown the rotating shutter common to devices of this character.

The film 18 is taken from a suitable reel or box and passes through the entrance chute 32 which consists of a funnel shaped body 33 carrying two fixed protecting rollers 34 and 35, said body 33 being pivotally attached to swing within the housing 36 adapted to be fastened to the top of the frame 10. The film after passing through this entrance chute 32 which will choke any fire and prevent ignition of the entire film, passes around the fixed guide roller 14, and then between the sprocket feed roller 12 and the spring pressed roller 13. A loop 37 is then made in the film before it reaches the gate 17. It then passes between the said gate and the face plate past the diaphragm 19. Upon leaving the gate 17 it passes about the fixed guide roller 22 and then about the adjusting roller 25 and the intermittent sprocket 15 and spring pressed roller 16. It then leaves the mechanism through an exit chute 38 comprising a flat narrow metallic chute which will likewise choke any fire and prevent burning of the entire film. This chute empties into a suitable magazine or receptacle 39 which is made fire-proof and is adapted to contain the loose film until it is desired to rewind the same upon a reel.

The operation of the adjustable roller 25 to frame the picture of the film with respect to the diaphragm 19 in the face plate 20 is as follows. By turning the thumb screw 26 the attached pinion 24 moves the rack 23 accordingly, and thereby the roller 25, the extreme positions of which are indicated in Fig. 2. The roller in thus moving permits of the shortening or lengthening of the loop 37 thus adjusting or framing the picture with respect to said diaphragm 20 as may be desired.

While I have shown the roller actuated by a rack and pinion I do not wish to restrict myself to this particular means as it is evident that equivalent means such as a cam or screw may be used to impart movement to the roller. Neither do I wish to restrict myself to any particular form or shape of the roller itself as I may substitute for the roller shown, a sprocket roller thereby preventing the surface of the film from rubbing on the roller.

I am aware that means are known to register or frame the picture of a film, but these means require the entire film feeding mechanism or the face plate and lens to be moved to accomplish this end, whereas my means are independent of the rest of the mechanism and acts through the shortening or lengthening of the loop 37 by the backward or forward motion of the roller 25.

By the word independent I wish to be understood as meaning not dependent upon the moving or changing of position of any part or parts of the film feeding mechanism, or the face plate and lens.

The simple mechanism shown will allow the apparatus to be readily converted into a camera or printing device by inclosing the entire mechanism in a light tight case and making a few necessary changes with regard to the lens, etc.

What I claim as new and desire to secure by Letters Patent of the U. S. is:—

1. In a kinetoscope: a film feeding device comprising a continuous feed sprocket and an intermittent take-up sprocket; a gate; a film having a portion between the feed sprocket and the gate freely looped; and means located between said sprockets and independent thereof, adapted to properly register the picture of said film by lengthening or shortening said loop.

2. In a kinetoscope: a film feeding device comprising a continuous feed sprocket and an intermittent take-up sprocket; a gate; a film having a portion between the feed sprocket and the gate freely looped; and a horizontally adjustable roller located between said sprockets and independent thereof, adapted to properly register the picture of said film by lengthening or shortening said loop.

3. In a kinetoscope: a film; a swinging entrance chute for said film; a feed sprocket; a gate; a face plate; an aperture therein; an intermittent take-up sprocket; independent means between said gate and intermittent take-up sprocket adapted to register the picture of said film with respect to said aperture; and an exit chute for said film.

4. In a kinetoscope: a film; a swinging entrance chute for said film; a feed sprocket; a gate; a face plate; an aperture therein; an intermittent take-up sprocket; independent means between said gate and intermittent take-up sprocket adapted to register the picture of said film with respect to said aperture; an exit chute for said film; and a fire-proof receptacle adapted to receive said film.

5. In a kinetoscope: a film and reel therefor; and a swinging entrance chute for said film.

Signed at New York, in the county of New York and State of New York, this 15th day of March A. D. 1906.

JEAN A. LE ROY.

Witnesses:
S. RAUNCE KRAUS,
FRED'K F. SCHUETZ.